INVENTOR
ADIN D. FALKOFF

BY Elmer Gallant
ATTORNEY

| COLUMN 1 | COLUMN 2 | COLUMN 3 | COLUMN 4 |
|---|---|---|---|
| ADDRESS | | VALUE STORED | SEARCH PATTERN |
| IN DECIMAL | IN BINARY | | |
| 1 | 1 | 000011 | |
| 2 | 10 | 000100 | |
| 3 | 11 | 000110 | |
| 4 | 100 | 000111 | |
| 5 | 101 | 001001 | |
| 6 | 110 | 001010 | |
| 7 | 111 | 001101 | |
| 8 | 1000 | 001111 | |
| 9 | 1001 | 010000 | |
| 10 | 1010 | 011001 | |
| 11 | 1011 | 011101 | |
| 12 | 1100 | 100001 | |
| 13 | 1101 | 100101 | |
| 14 | 1110 | 100111 | |
| 15 | 1111 | 101000 | |

INSTRUCTION FORMAT

United States Patent Office 3,267,433

Patented August 16, 1966

3,267,433
COMPUTING SYSTEM WITH SPECIAL PURPOSE INDEX REGISTERS

Adin D. Falkoff, Croton-on-Hudson, N.Y., assignor to International Business Machines Corporation, New York, N.Y., a corporation of New York Filed Aug. 24, 1962, Ser. No. 219,162
10 Claims. (Cl. 340—172.5)

This invention relates to electronic digital computers and more particularly to improved means of addressing the memory of a digital computer.

Present day electronic digital computers have index registers which are used to indirectly address the memory. These index registers are addressable so that desired numbers can be stored therein and the values stored in these registers can be automatically increased or decreased by a prespecified fixed amount each time that they are used.

The present invention provides an improved memory addressing system which includes an improved index register. The value stored in the index register in the system of the present invention can be automatically changed according to a complex pattern. The particular pattern of changes which the index register follows is dependent both upon logical rules which are built into the index register and upon data obtained during each memory access operation.

An object of the present invention is to provide an improved computing system.

A further object of the present invention is to provide a computing system having an improved index register.

Another object of the present invention is to provide an index register which operates according to a more complicated pattern than merely up and down counting.

Still another object of the present invention is to provide an index register wherein the amount stored therein can be automatically increased and decreased by an amount which is dependent upon both rules built into the index register and upon the data read from memory locations.

A still further object of the present invention is to provide an index register which facilitates performing a binary search operation.

The foregoing and other objects, features and advantages of the invention will be apparent from the following more particular description of preferred embodiments of the invention as illustrated in the drawings.

Figure 1:
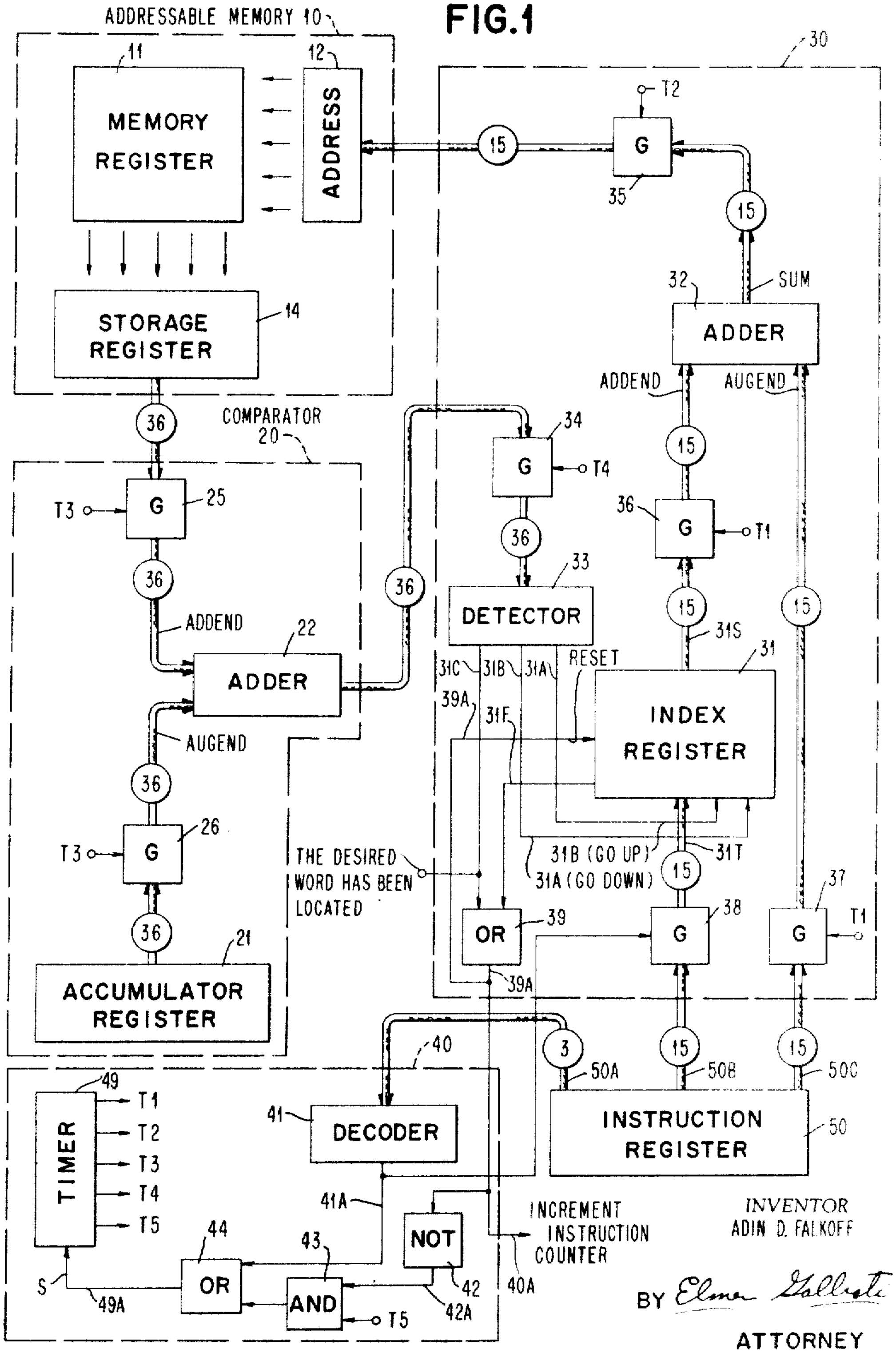
FIGURE 1 is a block diagram of the first embodiment of the invention.

A first preferred embodiment of the present invention is shown in block form in FIGURE 1. The system includes an addressable memory 10, a comparator 20, an address generating means 30, a control circuit 40 and an instruction register 50. Address generating circuit 30 and control circuit 40 provide addressable memory 10 and comparator 20 with the address and control signals necessary to perform a binary search operation in memory 10.

Figures 2, 3:
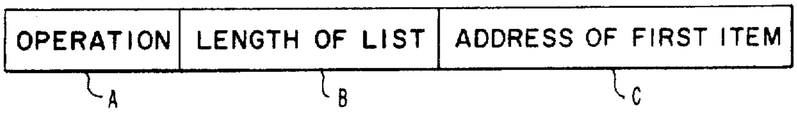
FIGURE 2 is a diagram showing binary search operations.
FIGURE 3 is a diagram showing the format of a binary search instruction.

A binary search operation is shown diagrammatically in FIGURE 2. Column 3 shows fifteen binary words which are stored in the particular memory locations specified in columns 1 and 2. It should be noted that taken as binary numbers the words shown in column 3 are ordered from the lowest to the highest. A binary search operation is one way of determining which particular location has a desired word stored therein. If, for example, one desires to determine which particular location has the word "001001" stored therein, one would proceed in the following fashion: First, location 8 (which lies in the center of the list) is interrogated and the binary word stored therein is compared to the desired word to determine (a) whether the location 8 contains the desired word, (b) whether the binary value of the word stored in location 8 is higher than the binary value of the desired word, or (c) whether the binary value of the word stored in location 8 is lower than the binary value of the desired word.

If location 8 contains the desired word the search is terminated. If the binary value of the word stored in location 8 is larger than the binary value of the desired word the location which lies halfway between location 8 and location 1 (that is, location 4) is interrogated next. If the binary value of the word stored in location 8 is smaller than the binary value of the desired word the location which is halfway between location 8 and location 15 (that is, location 12) is interrogated next. In the particular case shown in FIGURE 2 the binary value of the word stored in location 8 is greater than the binary value of the desired word; hence, the second location which is interrogated is location 4. The word stored in location 4 is then compared to the desired word and if the word stored in location 4 has a value which is smaller than the value of the desired word the location which lies halfway between location 4 and location 8 (that is, location 6) is next interrogated and if the word stored in location 4 has a value which is greater than the desired value that location which lies halfway betwen location 4 and location 1 (that is, location 2) is next interrogated. In the particular case shown in FIGURE 2 the value stored in location 41 is smaller than the desired value, hence, the next location interrogated is location 6. The procedure continues in the same manner. Since the value in location 6 is larger than the desired value the next location interrogated is the location halfway between location 6 and location 4 is smaller than the desired value, hence, the next is generally termed a binary search operation can be extended to longer lists.

The system of the present invention may form merely one small part of a relatively large general purpose digital computer. The computer may have a large number of instructions; however, in a computer which includes the present invention there is one particular instruction which initiates the previously described binary search operation. The format of the particular instruction which initiates a binary search operation is shown in FIGURE 3. The instruction has three fields designated A, B and C. Field A designates the particular operation, field B indicates the length of the particular list which is to be searched and field C indicates the address of the first item in the list minus one. For reasons which will be seen later with the first embodiment of the invention the list to be searched is always assumed to have $(2^n-1)$ words where $n$ is an arbitrary integer such that the entire list is included and the length of the list in field B of an instruction is given by the binary number $(2^{n-1})$. The binary number $(2^{n-1})$ is a number which has a ONE digit in the $n$th position and ZERO digits in all other positions. For a list $(2^n-1)$ words long the binary number $(2^{n-1})$ is the count of the middle entry in the list taking the first entry in the list as number ONE. For example, in the list shown in FIGURE 2, $n$ equals 4 and $(2^{n-1})$ equals fifteen, that is the list has fifteen words. The number $(2^{n-1})$ equals 8, that is, the eighth word is in the center of the list.

The components in memory 10, comparator 20, address generating circuit 30 and control circuit 40 will now be described. Memory System 10 includes a group of memory registers 11, and address register 12 and a storage register 14. Each time an address is gated into address register 12, the particular memory register designated by the address is accessed and the contents thereof are placed in storage register 14.

Comparator 20 includes an accumulator register 21, an adder 22, and gates 25 and 26. A word which is related to the binary word which one desires to locate is placed in the accumulator register 21 in a conventional manner before the binary search instruction is placed in register 50. The binary value of the word placed in accumulator register 21 is the negative of the binary value of the desired word so that when the number in accumulator 21 is added to the desired value the resulting sum is ZERO. One way in which the appropriate value can be initially placed in accumulator 21 is explained hereinafter.

The address of the particular memory location in memory 10 which is interrogated at any particular time is generated by circuitry 30. Circuitry 30 includes index register 31, adder 32, gating circuits 34 to 38 and OR circuit 39. The transfer of information between the various components in circuit 30 is controlled by circuit 40.

Circuit 40 includes decoder 41, logical blocks 42 to 44 and timer 49. Decoder 41 detects when a binary search instruction is placed in instruction register 50. When a binary search instruction is placed in instruction register 50 decoder 41 produces a pulse on line 41A which through OR circuit 44 initiates the operation of timer 49. Timer 49 has five outputs designated T1 to T5 which are sequentially activated each time line 49A is activated. For ease of illustration ouputs T1 to T5 are not connected to the various circuits which they control. Instead the designations T1 to T5 are used to show the lines controlled by the outputs of the timer. For example, the control lines for gates 36 to 37 in circuit 30 are connected to output T1 of timer 49.

The system operates as follows: First, the negative of the desired word (i.e., the desired word with a negative algebraic sign) is placed in accumulator 21. Then the binary search instruction is placed in instruction register 50. Decoder 41 responds to field A of a binary search instruction and it activates line 41A. Activation of line 41A gates the binary number which indicates the count of the middle word in the list taking the first word as number ONE from field B of the instruction register 50 to index register 31 and it starts timer 49 through OR circuit 44. Each time timer 49 is activated the following sequence of operations occur. At time T1 the address of the first entry in the list minus one is gated from field C of the instruction register 50 to adder 32 where it is added to the number in index register 31. This generates the address of a location in memory. During time period T2 this particular location in memory 10 is interrogated and the contents thereof are sent to comparator 20.

During time period T3 the number in accumulator 21 is algebraically added to the contents of the interrogated location by adder 22. As previously stated the desired word (with a negative algebraic value) is stored in accumulator 21. During time period T4 the sum generated by adder 22 is gated to detector 33 and one of the following conditions occur: (a) If the binary value of the desired word is lower than the binary value of the word stored in the interrogated location the sum generated by adder 22 is positive and detector 33 activates lines 31A; (b) if the binary value of the desired word is higher than the binary value of the word stored in the interrogated location the sum generated by adder 22 is negative and detector 33 activates line 31B, or (c) if the binary value of the desired word is equal to the binary value of the word stored in the interrogated location the sum generated by adder 22 is ZERO and detector 33 activates line 31C.

In a manner which will be explained in detail later, when a signal is applied to line 31A the contents of index register 31 is decreased by one-half the amount of the last change to which the register was subjected (or during the first cycle by one-half the value then stored in the index register) and when a signal is applied to line 31B the contents of index register 31 is increased by one-half the amount that the register was last changed (or during the first cycle by one-half the value then stored in the index register). If during time period T5 either line 31A or 31B is activated (and enough words in the list have not been interrogated to determine that the desired word is not in the list) another cycle is initiated by AND circuit 43 through OR circuit 44.

If the binary value of the words stored in an interrogated location equals the value of the desired word, line 31C is activated by detector 33. The activation of line 31C through OR circuit 39 activated the input of inverter 42 which deactivates one input to AND circuit 43 preventing another cycle of timer 49. The output of OR circuit 39 also activates line 40A which brings another instruction into instruction register 50, thereby terminating the binary search operation. In a manner which will be explained later, index register 31 activates line 31F after it has been determined that the desired word is not in the list being searched (line 31F is also activated in one other special circumstance not here relevant). Hence, if line 31C is inactive at the end of a cycle indicating that the desired word has not been located and line 31F is inactive indicating that the desired word may be in the list which is being searched, another cycle is initiated at time T5 through AND circuit 43 and OR 44. When line 31F is activated indicating that the desired word is not in the list or when line 31C is activated indicating that the desired word has been located, line 39A is activated thereby deactivating line 42A. Activation of line 39A also activates the reset input of index register 31 which prepares the register for the next binary search instruction.

Figure 4:
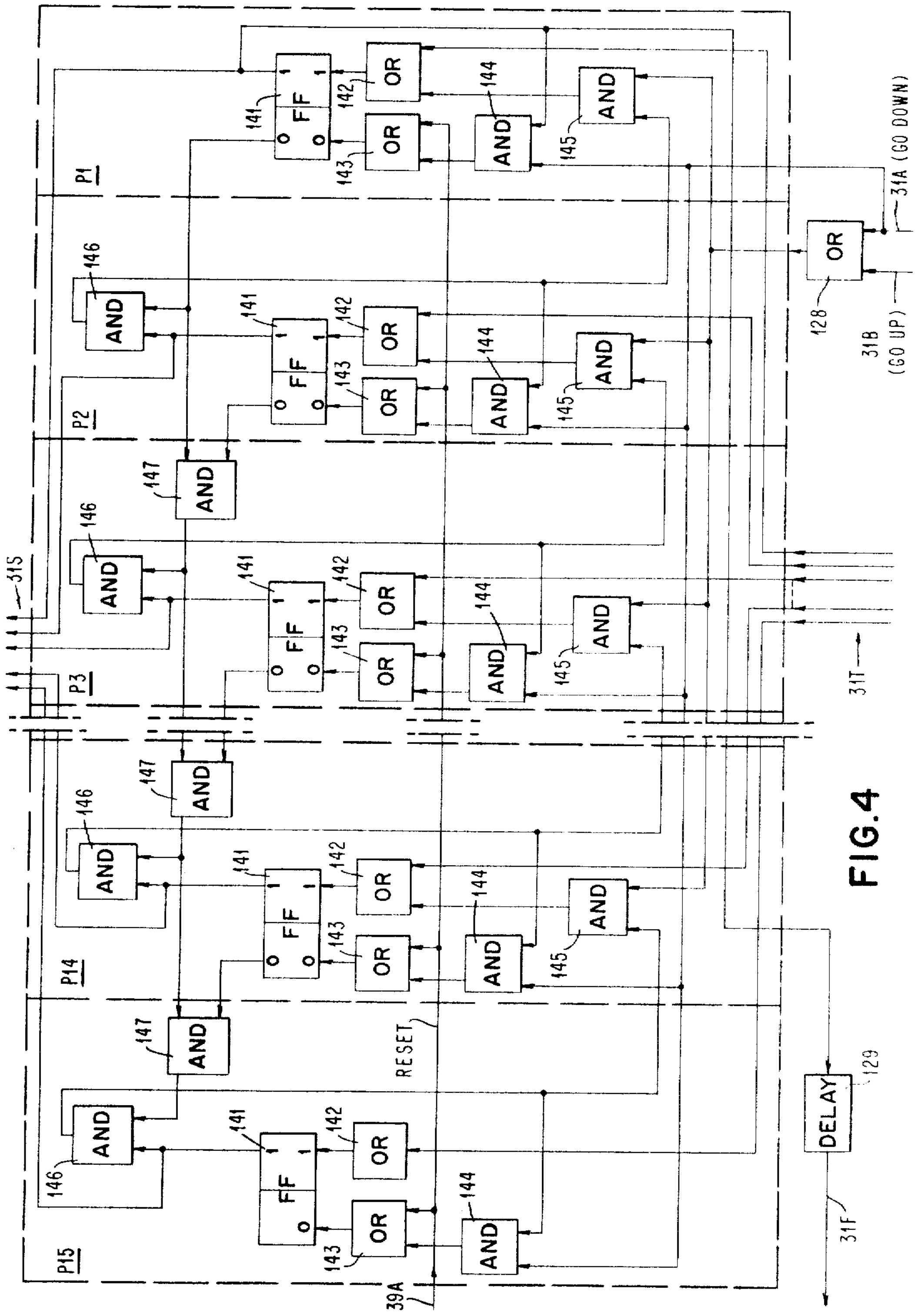
FIGURE 4 is a logical diagram of the index register shown in FIGURE 1.

The details of index register 31 (which are shown in FIGURE 4) will now be explained. Register 31 has fifteen positions respectively designated P1 to P15. For ease of illustration positions P4 to P13 are not shown in FIGURE 4 since each of the positions (except positions P1, P2 and P15) are identical. In general, each position has a flip-flop 141, two OR circuits 142 and 143 and four AND circuits 144 to 147. Positions P1, P2 and P15 are similar to the other positions; however, due to their location at the beginning and at the end of the register certain of the components are not needed. The index register 31 also has an OR circuit 128.

Each of the flip-flop circuits 141 have two stable states, respectively designated the ZERO state and the ONE state. Each flip-flop has a ONE output and a ZERO ouput and a ONE input and a ZERO input. A flip-flop is set to the ONE state when the ONE input is activated and it is set to the ZERO state when the ZERO input is activated. The ONE output of a flip-flop is activated whenever the flip-flop is in the ONE state and the ZERO output is activated whenever the flip-flop is in the ZERO state.

When a binary search instruction is placed in instruction register 50 all of the flip-flops 141 are in the ZERO state. The reason for this is that after each search operation line 39A is activated which resets the register. When after a search instruction is placed in register 50 decoder 31 activates line 41A, the contents of field B of the binary search instruction is gated through gate 38 to input 31T of index register 31. Signals on input 31T set flip-flop 141 through OR circuit 142.

The value stored in index register 31 is decreased when line 31A is activated and it is increased when line 31B is activated. The value stored in register 31 is increased when line 31B is activated in the following manner. Each position in the register (except the first and second) has an AND circuit 147 associated therewith the output of which is active when all the positions to the right of the associated position have ZEROS stored therein. The output of each AND circuit 147 activates one of the inputs of the AND circuit 146 which is in the associated position. The second input of AND circuit 146 is activated by the ONE output of the associated flip-flop. The output of each AND circuit 146 is activated when all of the positions to the right of the associated position have ZERO stored therein and the associated position has a ONE stored therein. The output of each AND circuit 146 activates one of the inputs of AND circuit 145 in the previous (next lower order) bit position. The second input to each AND circuit 145 is activated by line 31B through OR circuit 128. The output of each AND circuit 145 through OR circuit 142 sets the associated bit flip-flop to the ONE state. Hence, each time line 31B is activated each bit position which has the three conditions set out below fulfilled, is set to the ONE state.

(a) The particular bit position is set to the ZERO state.
(b) All the positions to the right of the particular position are in the ZERO state.
(c) The position immediately to the left of the associated position is in the ONE state.

As previously explained, initially a number which has only one ONE is stored in register 31 (this is the number gated from instruction register 50 to the index register). If line 31B is activated when the register has one ONE stored therein, the position which is one place to the right of the position which has the ONE stored therein is set to the ONE state. This increases the value of the number stored in the register by one-half the value initially stored in the register. If two adjacent ones are stored in the register and line 31B is activated the position to the right of the lowest order position containing a ONE is set to the ONE state thereby increasing the value stored in the register by one-half the amount that this value was increased during the previous cycle, etc.

The value stored in register 31 is decreased in the following manner. The output of each AND circuit 146 activates one of the inputs to the AND circuit 144 in the associated position. The second input to each AND circuit 144 is activated by line 31A. The output of each AND circuit 144 through OR circuit 143 sets the associated flip-flop to the ZERO state. Hence, a bit position is set to the ZERO state when line 31A is activated if it fulfills the following conditions:

(a) The particular bit position is in the ONE state.
(b) All of the positions to the right of the particular position are in the ZERO state.

Line 31A also activates one of the inputs of OR circuit 128 thereby having the same effect as the activation of line 31B. The result is that each time line 31A is activated the lowest order position which has a ONE set therein is set to the ZERO state and the next lower order position is set to the ONE state. Stated differently, each time line 31A is activated the lowest order ONE is shifted one position to the right. This in effect decreases the value stored in the register by one-half the value of the change effected during the preceding cycle.

Output 31F is activated by delay circuit 129 slightly after position P1 is set to the ONE state. Delay circuit 129 introduces a delay equal to the delay between time period FOUR and FIVE so that the line 31F is only activated after the search of the last position has begun. It should be noted that due to the nature of a binary search each word in a list need not be interrogated to determine that a desired word is not in the list. If a binary search pattern is followed and the word in the list with the lowest address is being searched, either the desired word is in the position being searched or it is not in the list.

As previously explained the addressing system of the present invention may merely form one part of a relatively large computer. For example, the indexing system of the present invention could be added to the computer known commercially by the trade name IBM 704. The above computer has as part thereof the addressable memory 10, the comparator 20 (except gates 25 and 26) and the instruction register 50. The binary search instruction is what is termed as type A instruction in the 704. That part of the instruction herein designated as field A is stored in bit positions S to 2 of the instruction, that part of the instruction herein designated as field B is stored in bit positions 3 to 17 of the instruction and that part of the instruction herein designated field C is stored in bit positions 22 to 35 of the instruction. The binary search instruction could for example, be designated by the numeral "001" in bit positions S to 2 of an instruction. Decoder 41 which responds to the binary search instruction and produces a pulse on line 41A, timer 49 which produces the necessary sequence of timing signals, adder circuit 22, detector 33, the various gates and the various logical blocks are conventional in the art and no detailed explanation thereof is given herein.

With the first embodiment of the invention the index register 31 is incremented and decremented amounts based on the assumption that the list being searched has $(2^{n-1})$ items. Naturally for lists of different lengths spaces with ZEROS stored therein can be left or other non interfering information can be stored to produce a list of an acceptable length.

Figure 5:
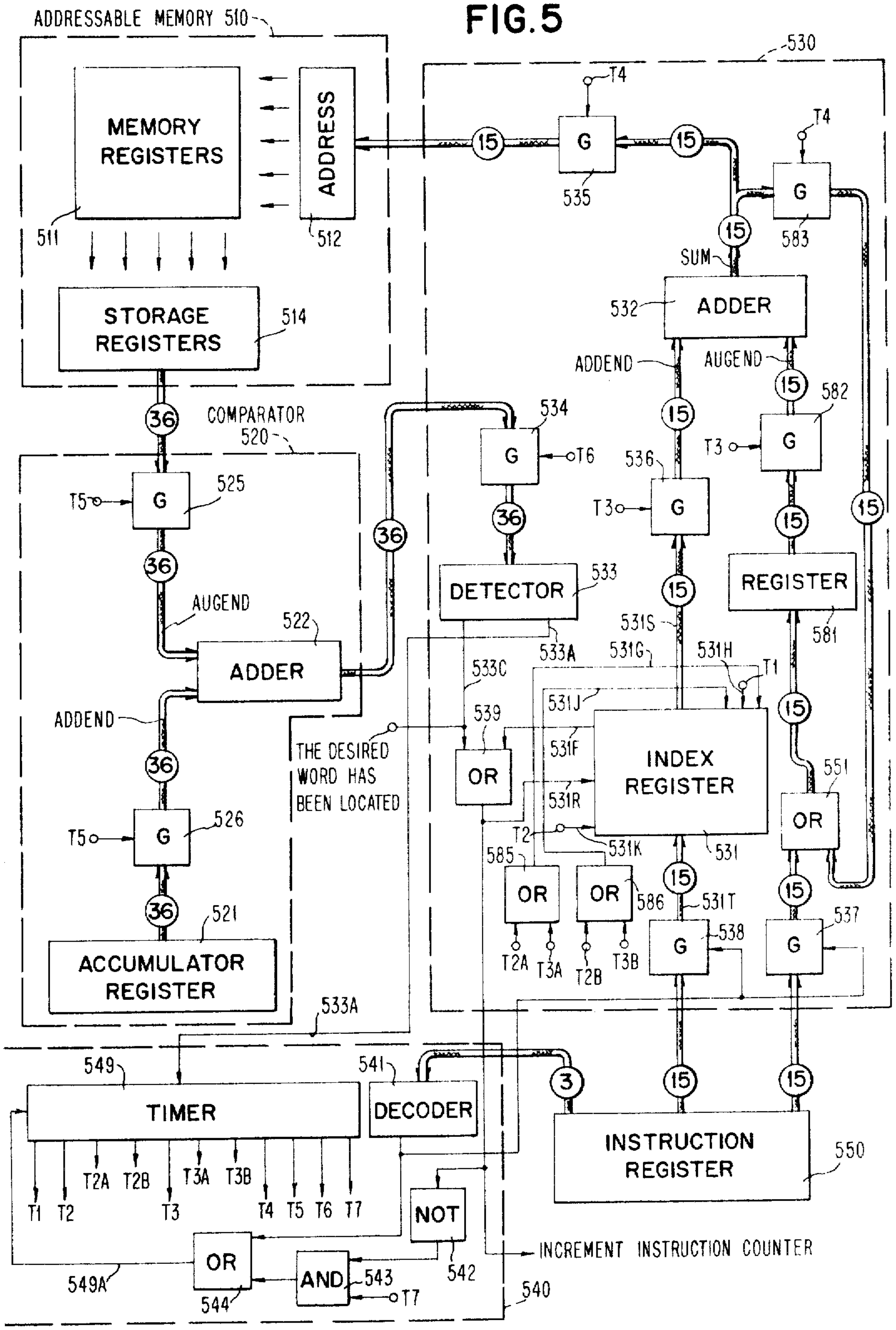
FIGURE 5 is a block diagram of a second embodiment of the invention.

A block diagram of a second embodiment of the invention is shown in FIGURE 5. With the second embodiment of the invention the list which is being searched may have any arbitrary length.

The instruction which initiates the operation of the second embodiment of the invention has the same format as that shown in FIGURE 3. That is, it has three fields designated A, B and C which respectively give the operation to be performed, the length of the list and the address of the first item in the list. During the operation of the second embodiment the address of the last memory location interrogated is added to the contents of the index register to give the address of the location which is to be interrogated next. This is in contrast to the first embodiment of the invention wherein the contents of the index register is added to the address stored in field C of the instruction to give the address of the memory location to be interrogated next.

The block diagram of the second embodiment (FIGURE 5) is similar to the block diagram of the first embodiment shown in FIGURE 1 and previously explained except for certain differences pointed out below. To show a correspondence between the first embodiment of the invention and the second embodiment of the invention three digit numerals are used to designate the components shown in FIGURE 5. The last two numerals of these three digit numerals are identical to numerals used to designate the corresponding components of FIGURE 1.

The system shown in FIGURE 5 has the following differences from the system shown in FIGURE 1. An extra register 581 is provided, gates are provided to gate an address from the output of adder 532 to register 581, index register 531 has a number of different control inputs, timer 549 has an additional input from detector 533 and a number of different outputs, and gates 537 and 538 are controlled by the output of decoder 541 so that the contents of fields B and C of register 550 are gated to registers 531 and 581 immediately after a binary search instruction is placed in register 550.

Timer 549 operates as follows: When line 533A is inactive and line 549A is activated, the seven outputs T1, T2, T3, T4, T5, T6 and T7 are sequentially activated.

If line 533A is first activated and the line 549A is activated outputs T2A, T2B, T3A and T3B are also activated during the cycle. In this case the outputs are activated in the following order. T1, T2, T2A, T2B, T3, T3A, T3B, T4, T5, T6 and T7.

Detector 533 has two outputs designated 533A and 533C. If the binary value of the words stored in an interrogated location is higher than the binary value of the desired word output 533A is activated. If the binary value of the words stored in an interrogated location equals the value to the binary value of the desired word output 533C is activated. If the binary value of the word stored in an interrogated location is lower than the binary value of the desired word neither of the outputs is activated.

Index register 531 has five inputs 531G, 531H, 531J, 531K and 531R. These inputs have the following functions. When input 531R is activated all of the positions in the register are reset to ZERO. When input 531H is activated ONE is added to the number stored in the register if the register has an odd number stored therein. If the register has an even number stored therein activation of input 531H has no effect. When input 531K is activated the number stored in register 531 is shifted one position to the right.

When input 531G is activated each position in the register is complemented (that is, the state of each position in the register is changed). When input 531J is activated ONE is added to the number stored in the register. Hence, if input 531G is activated and then input 531J is activated the TWOS COMPLEMENT of the number initially stored in the register 531 is generated. It should be noted that as is well known in the art adding the TWOS COMPLEMENT of a first binary number to a second binary number has the same effect as subtracting the first binary number from the second binary number.

The register also has an output 531F which is activated a slight time after the register has the number ONE stored therein. The system goes through two different types of cycles. The first type of cycle takes place immediately after a binary search instruction is placed in register 40 and after a cycle wherein the binary value of the word stored in the interrogated location is lower than the binary value of the desired word. The second type of cycle takes place after a cycle wherein the binary value of the word stored in the interrogated location is higher than the binary value of the desired word. These different types of cycles will now be separately explained.

The first type of cycle is initiated when none of the outputs of detector 533 are active. In this case input 533A to timer 549 is not activated and hence only outputs T1, T2, T3, T4, T5, T6 and T7 are sequentially acitvated. During time period T1, input 531H is activated so that one is added to the contents of index register 531 if the contents thereof is odd. During time period T2 input 531K is activated. This shifts the contents of index register 531 one position to the right thereby decreasing the value stored therein by one half. During time period T3 the contents of index register 531 are added to the contents of register 581 by adder 532. During time period T4 the sum generated by adder 532 is used as an address to interrogate memory 520 and this same sum is stored in register 581 through gate 583 and OR circuit 551 thereby replacing the value previously stored therein. During time period T4 the addressed location is interrogated and the contents thereof are compared to the value stored in accumulator 521 as is in the first embodiment of the invention. During time period T6 the sum generated by adder 522 is gated to detector 533. If the contents of the interrogated location equal the desired word detector 533 activates line 531C which through OR circuit 539 terminates the search. If the binary value of the word stored in the interrogated location is higher than the binary value of the desired word, detector 533 activates output 531A. If the binary value of the contents of the word stored in the interrogated location is lower than the binary value of the desired word neither line 531A nor line 531C is activated. When line 531C is not activated (that is, when the desired word has not been located) at time T7 the output of AND circuit 543 through OR circuit 544 activates line 549A which restarts timer 549. If line 531A is inactive when line 549A is activated another cycle of the first type is initiated. If line 531A is active when line 549A is activated a cycle of the second type which is explained below results.

The second type of cycle which results when line 531A is active indicating that the binary value of the word stored in the previously interrogated location is higher than the binary value of the desired word. The activation of line 531A causes timer 549 to go through the cycle T1, T2, T2A, T2B, T3, T3A, T3B, T4, T5, T6 and T7. The following operations take place during the various time periods. During time period T1 line 531H is activated so that ONE is added to the contents of index register 531 if the contents are odd. During time period T2 the contents of index register 531 are shifted one position to the right thereby decreasing the value stored in index register 531 by one-half. During time period T2A, and T2B, lines 531G and 531J are sequentially activated through OR circuits 585 and 586 thereby generating the TWOS COMPLEMENT of the value stored in index register 531. During time period T3 the TWOS COMPLEMENT so generated is added to the contents of register 581 by adder 582. As is well known in the art this has the same effect as subtracting the number initially in register 531 from the number in register 581. During the period T3A, and T3B, the contents of index regitser 531 are recomplemented. During time periods T4, T5, T6 and T7 the address generated by adder 532 is used to interrogate memory 520, the contents in the interrogated location is compared to the desired word and another cycle is initiated in the previously described manner. It is noted that outputs T3A and T3B can be activated at the same time that output T4 and T5 are activated. Likewise, in each cycle (except the first cycle of each search operation) outputs T1 and T2 can be activated simultaneously with outputs T6 and T7 of the preceding cycle. It is noted the simultaneous activation of timer outputs is not essential to the systems operation. It merely increases the systems speed.

Figure 6:
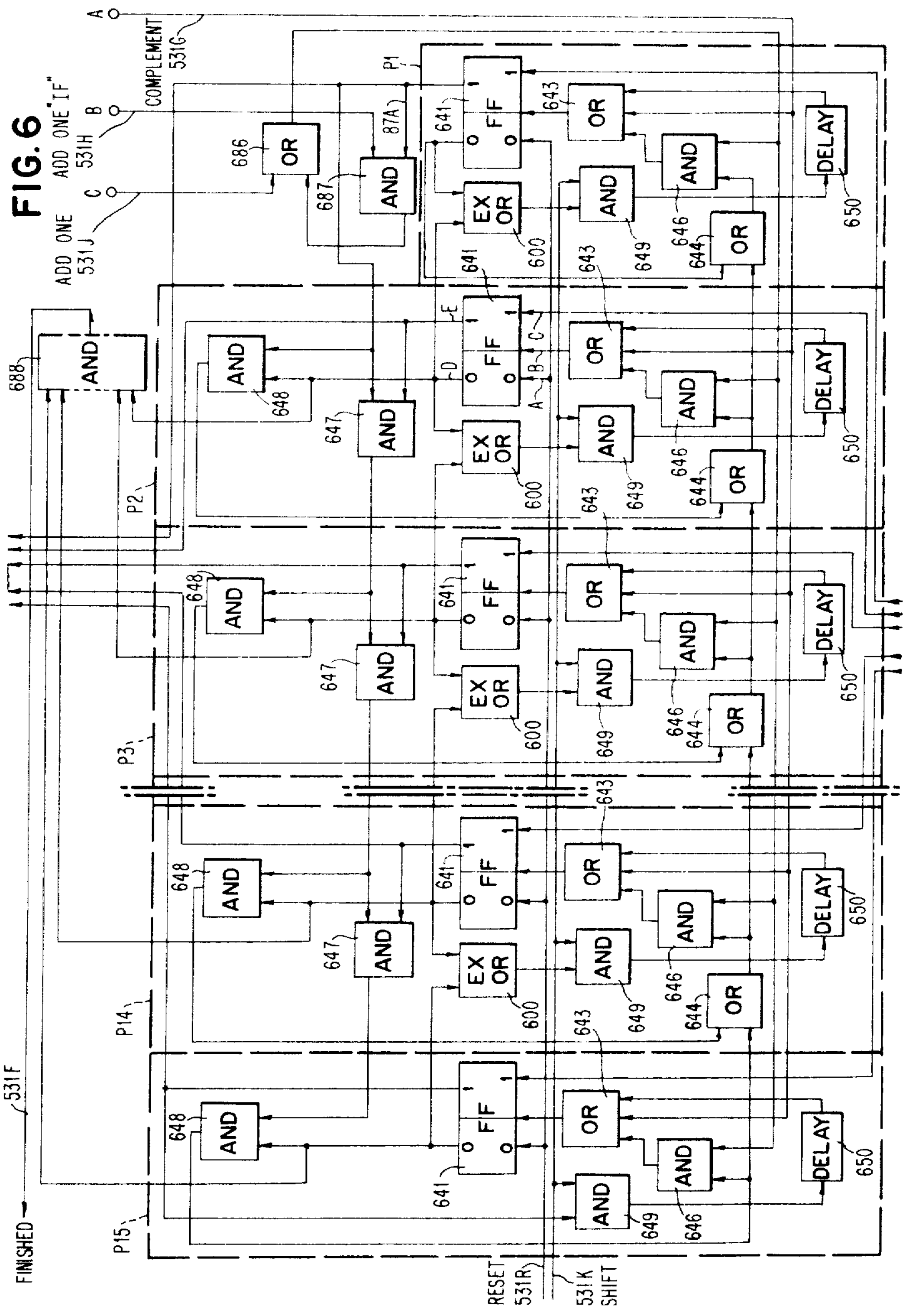
FIGURE 6 is a logical diagram of the index register of the second embodiment of the invention.

The details of index register 531 are shown in FIGURE 6. The register has fifteen positions P1 to P15, each of which has a flip-flop 641. Each position (except the first and the last) also has two OR circuits 643 and 644, four AND circuits 646, 647, 648 and 649 and an exclusive OR circuit 600. Each flip-flop 641 has three inputs respectively designated A, B and C and two outputs respectively designated D and E. Each flip-flop has two stable states respectively designated ZERO and ONE. Output D is activated when a flip-flop is in the ZERO state and output E is activated when the flip-flop is in the ONE state. The flip-flop is set to the ZERO state when input A is activated and the flip-flop is set to the ONE state when input C is activated. Input B is a complementing input and whenever input B is activated the state of the flip-flop is changed.

Circuit 531 also has OR circuit 686 and two AND circuits 687 and 688 which are not particularly associated with any one position in the register. Register 531 has five logical inputs respectively, designated 531J, 531H, 531G, 531K and 531R and a logical output 531F. Circuit 531 has a data input 531T and a data output 531S.

A signal applied to input 531G complements (that is, changes the state), of each of the flip-flops 641 through OR circuits 643. A signal applied to input 531H adds one to the number stored in the register if the number is odd otherwise it has no effect. This is accomplished through AND circuit 687, OR circuit 686, AND circuits 646 and OR circuits 643. If the number stored in the register 531 is odd, the lowest order position P1 is in the ONE state and output E of bit position P1 is activated thereby activating input 687A of AND circuit 687. The second input of AND circuit 687 is activated by input 531H thereby activating the output of AND circuit 687. The output of AND circuit 687 through OR circuit 686 activates one of the inputs of each of the AND circuits 646.

Each position (except the first) has an AND circuit 648 associated therewith. The output of each AND circuit 648 is active when all the positions to the right of the associated position have ONE stored therein and the associated positions has a ZERO stored therein. In order to add one to the number stored in the register at any particular time, that position wherein AND circuit 648 is active must be changed to the ONE state and all the positions to the right thereof must be changed to the ZERO state. The position associated with the AND circuit 648 which has an active output is changed to the ONE state by complementing it through the action of OR circuit 644, AND circuit 646 and OR circuit 643. All the positions to the right of this position are changed to the ZERO state by complementing them through OR circuit 644, AND circuit 646 and OR circuit 643. Input 531J adds one to the number stored in the register irrespective of whether the number is odd or even. This is in contrast to input 531H which adds one to the number only if the number is odd. Input 531J acts the same way as input 531H except that input 531J is a direct input to OR circuit 686 whereas input 531H only activates OR circuits 686 if the flip-flop in position P1 is in the ONE state thereby activating AND circuit 687.

When input 531K is activated the number stored in register 531 is shifted one position to the right. This is accomplished through EXCLUSIVE OR circuits 600, AND circuits 649, delay circuits 650 and OR circuit 643. The output of the EXCLUSIVE OR circuits 600 associated with each position is activated when the next higher order position is not in the same state as the associated position. The output of each EXCLUSIVE OR circuit 600 is not activated when the associated position and the next higher order position are in the same state.

It is noted that when a bit position and the next higher order position are in the same state the position need not change state when information in the register is shifted one position to the right. The only time that a position need change state when the information is shifted right one position is when the next higher order position is in a different state. The output of each EXCLUSIVE OR circuit 600 activates one of the inputs of the AND circuit 649 in the associated position. The second input to each AND circuit 649 is activated by input 531K. Hence, when a position is in a different state from the next higher order position and a pulse is applied to line 531K a pulse appears on the output of AND circuit 649 and some time later this pulse appears on the output of the associated delay circuit 650. The pulse passes through the associated OR circuit 643 thereby changing the state of the associated flip-flop.

The manner of loading instruction register 550 and accumulator 521 is conventional and no explanation thereof is given herein. As with the first embodiment, the second embodiment may merely form one part of a relatively large computer. If the system shown herein is part of a large computer the output of decoder 541 could be used to interrupt the normal instruction execution cycle and the output of OR circuit 539 could be used to start another instruction cycle which would bring another instruction into instruction register 550.

The systems described herein compare the entire contents of each interrogated memory location with a desired word which has as many bit positions therein as does the interrogated memory location. Similarly, merely a portion of each word (that is, one particular field in each word) could be compared to a desired word which has as many bit positions as the particular field of interest. In this case the remaining portion of the word could be used to store other information. That portion of each memory location which is compared to a desired set of binary bits is herein termed a word. It should be noted that the memory system described herein can be termed a content addressed or an associative memory system.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A multiposition register having,
a bistable element associated with each of the positions of said register, each of said elements having a ONE state and a ZERO state,
an increment input and a decrement input,
means operative in response to either of said inputs for changing the state of the bistable element associated with the position which is one order lower than the lowest order position which is in the ONE state,
means operative in response to said decrement input for changing the state of the bistable element associated with said lowest order position which is in the ONE state.

2. A computing system including an addressable memory,
an index register having a plurality of bistable elements arranged from a highest order bistable element to a lowest order bistable element, each of said bistable elements having a ONE state and a ZERO state,
a first register for storing a particular binary word,
means for interrogating memory locations determined by the address in said index register,
comparison means for comparing the contents of interrogated memory locations to the particular word in said first register, and for indicating whether the binary value of the contents of the interrogated location is equal, higher or lower than the contents of said first register,
means operative in response to said comparison means if the contents of said interrogated location is lower than the contents of said first register, for changing the state of the bistable element in said index register associated with the position which is one order lower than the lowest order position which is in the ONE state,
means, including in part said above-mentioned means, operative in response to said comparison means if the contents of said interrogated location is higher than the contents of said first register for changing the state of the bistable element in said register associated with the lowest order position which is in the ONE state and for changing the state of the bistable element associated with the next lower order position,
whereby said memory locations are interrogated in a binary search pattern.

3. In a computer which has an addressable memory, a system for searching a list of words in said memory to determine the particular location wherein a desired word is stored,
a first register for storing said desired word,
a second register for storing the address of the first entry in said list minus ONE,
a multiposition index register,
means for intially storing the length of said list in said index register,
means operative after said index register has been loaded and after each cycle during which the desired word has not been located for adding ONE to the contents of said index register if said contents are odd and for shifting the contents of said index register one position to the right, means for generating an address by summing the contents of said index register with the contents of said second register, means for interrogating the particular memory location specified by that address and for replacing the contents of said second register by said address, comparison means for comparing contents of an interrogated memory location to the particular word in said first register and for indicating whether the binary value of the contents of said interrogated location is equal, higher or lower, than the contents of said first register, and means operable after said shifting means if the contents of said interrogated location is higher than the contents of said register for generating the TWOS COMPLEMENT of the value in said index register before the contents of said index register are summed with the contents of said second register and for recomplementing the contents of said register after the summing operation and before the contents of the index register is again shifted, whereby said memory locations are interrogated in a binary search pattern.

4. The device recited in claim 3 wherein said means operative in response to said comparison means if the contents of said interrogated location is higher than the contents of said first register for generating the TWOS COMPLEMENT of the value in said index register comprises, means for complementing each position in said index register, and means for adding one to the contents of said index register.

5. A computing system including an addressable memory, an index register having a plurality of bistable elements arranged from a highest order bistable element to a lowest order bistable element, each of said bistable elements having a ONE state and a ZERO state, a first register for storing a particular binary word, a second register for storing an address, means for interrogating the memory location determined by the sum of the contents of said index register and said second register, comparison means for comparing the contents of interrogated memory locations to the particular word in said first register, and for indicating whether the binary value of the contents of the interrogated location is equal, higher or lower than the contents of said first register, means operative in response to said comparison means if the contents of said interrogated location is lower than the contents of said first register, for changing the state of the bistable element in said index register associated with the position which is one order lower than the lowest order position which is in the ONE state, means, including in part said above-mentioned means, operative in response to said comparison means if the contents of said interrogated location is higher than the contents of said first register for changing the state of the bistable element in said register associated with the lowest order position which is in the ONE state and for changing the state of the bistable element associated with the next lower order position, whereby said memory locations are interrogated in a binary search pattern.

6. A computing system comprising an addressable memory having an ordered list stored in successive locations therein, an index register, means for storing in said index register the number of the middle entry in said list taking the first entry as number ONE, a first register for storing the address of the first entry in said list minus ONE, means for adding the value stored in said index register to the contents of said first register to generate the address of a particular one of said addressable memory registers, means for reading the information stored in said particular addressable memory location and for comparing the contents of said particular register to a desired value, means for decrementing said index register by one-half of the value of the last change in the value therein if the value read from said particular memory location is greater than said desired value, means for incrementing said index register by one-half the value of the last change in the value stored in said index register if the value stored in said particular memory location is less than said desired value.

7. An address generating circuit for a binary search operation comprising:

a multiposition register having a bistable element associated with each position in said register, each of said elements having a ONE state and a ZERO state, means for storing the last address generated by said circuit, means for indicating that the last address generated is too high, means operative when the contents of said register are odd for adding one to the value stored therein, means for shifting the contents of said register one position to the right, means for normally adding the contents of said register to the contents of said storing means, said adding means being operative in response to an indication from said indicating means to effectively subtract the contents of said register from the contents of said storing means, and means for applying the output from said adding means to said storing means.

8. An address generating circuit for a binary search operation comprising:

a multiposition register having a bistable element associated with each position in said register, each of said elements having a ONE state and a ZERO state, means for storing the last address generated by said circuit, means for indicating that the last address generated is too high, means operative when the contents of said register are odd for adding ONE to the value stored therein, means for shifting the contents of said register one position to the right, means responsive to an indication from said indicating means for generating in said register the TWOS COMPLEMENT of the value stored therein, means for adding the contents of said register to the contents of said storing means, and means for applying the output from said adding means to said storing means.

9. A circuit of the type described in claim 8 including; means operative after said adding means in response to an indication from said indicating means for recomplementing the contents of said register.

10. A system for searching an addressable memory for a desired entry comprising:

an index register, means for initially storing a selected value in said index register, means for utilizing the value in said index register to determine the address of an entry in said memory, means for reading out the entry at said determined address, means for determining if the entry read out is said desired entry, and means responsive to a first indication that the entry read out is not said desired entry for changing the value stored in said index register by an amount equal to half its existing value and responsive to subsequent indications for changing the value stored in said index register by an amount equal to half the amount of the last change, whereby said address determining means determines addresses in a binary search pattern.

References Cited by the Examiner

UNITED STATES PATENTS

| | | | |
|---|---|---|---|
| 2,892,997 | 6/1959 | Yandell | 340—174 |
| 2,925,218 | 2/1960 | Robinson et al. | 235—157 |
| 2,968,003 | 1/1961 | Apgar | 328—44 |
| 2,977,539 | 3/1961 | Townsend | 328—44 |
| 2,988,701 | 6/1961 | Clapper | 328—37 |
| 3,015,441 | 1/1962 | Rent et al. | 235—157 |
| 3,037,700 | 6/1962 | Clapper | 235—157 |
| 3,105,143 | 9/1963 | Hosier et al. | 235—157 |
| 3,153,775 | 10/1964 | Marsh | 340—172.5 |
| 3,174,106 | 3/1965 | Urban | 328—37 |

OTHER REFERENCES

Robert R. Seeber, Jr.: Associative Self-Sorting Memory in Proceedings of the Eastern Joint Computer Conference, pp. 179–188, Dec. 13–15, 1960.

ROBERT C. BAILEY, *Primary Examiner.*

I. S. KAVRUKOV, *Assistant Examiner.*